United States Patent [19]

Burns

[11] 4,266,994
[45] May 12, 1981

[54] METHODS FOR MAKING DYNAMOELECTRIC MACHINE PHASE INSULATORS

[75] Inventor: Richard D. Burns, Holland, Mich.

[73] Assignee: General Electric Company, Fort Wayne, Ind.

[21] Appl. No.: 8,603

[22] Filed: Feb. 1, 1979

[51] Int. Cl.³ .................... B29C 17/02; B29C 17/10; B32B 31/16
[52] U.S. Cl. .................... 156/73.2; 156/161; 156/197; 156/229; 264/152; 264/153; 264/291
[58] Field of Search .................... 264/153, 154, 291; 156/73.1, 73.2, 73.4, 160, 161, 197, 211, 229; 310/214, 215, 260, 270

[56] References Cited

U.S. PATENT DOCUMENTS

| | | | |
|---|---|---|---|
| 1,220,600 | 3/1917 | Burke | 264/154 |
| 1,589,817 | 6/1926 | Reardon | 310/215 |
| 2,701,317 | 2/1955 | Herman | 310/215 |
| 3,109,947 | 11/1963 | Thompson et al. | 310/260 |
| 3,575,623 | 4/1971 | Stine | 310/260 |
| 3,874,963 | 4/1975 | Barger | 156/73.2 |
| 4,100,005 | 7/1978 | McNeal | 156/73.1 |
| 4,189,809 | 2/1980 | Sotos | 264/154 |

FOREIGN PATENT DOCUMENTS

| | | | |
|---|---|---|---|
| 943137 | 7/1949 | Fed. Rep. of Germany | 310/215 |
| 882323 | 11/1961 | United Kingdom . | |
| 1194085 | 6/1970 | United Kingdom . | |
| 1461126 | 1/1977 | United Kingdom . | |

OTHER PUBLICATIONS

*Man–Made Fibrer*, R. W. Mononeff, Heywood Books, London, pp. 406–407.

*Primary Examiner*—James B. Lowe
*Attorney, Agent, or Firm*—Ralph E. Krisher, Jr.

[57] ABSTRACT

Methods are disclosed for making a phase insulator for a desired core size from a phase insulator of a smaller size. The insulator may be severed from a sheet of insulating material or fabricated from planar insulation pieces alone or from a combination of planar insulation pieces and one or more filamentary pieces. Details of different methods, insulators, and apparatus are also disclosed.

27 Claims, 8 Drawing Figures

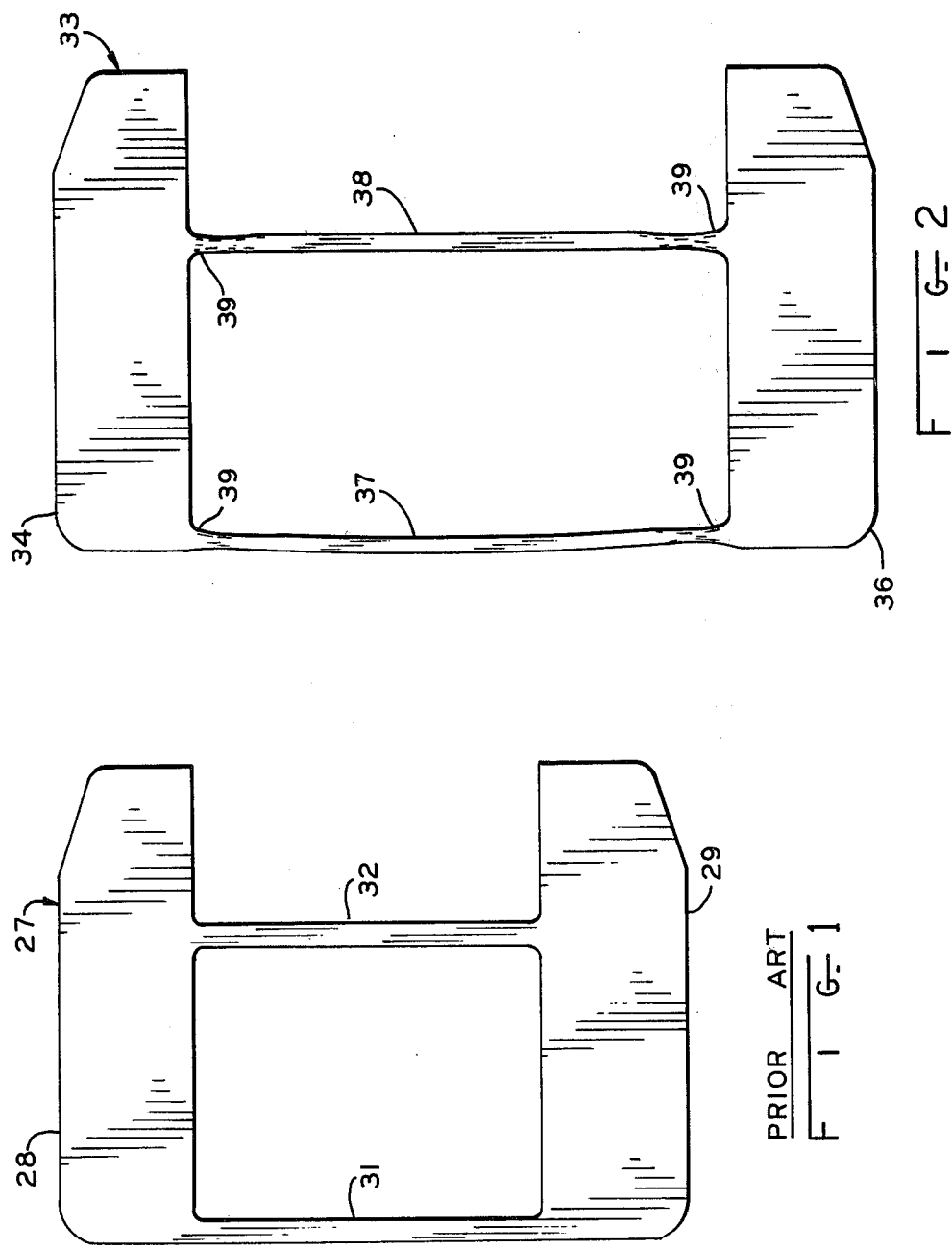

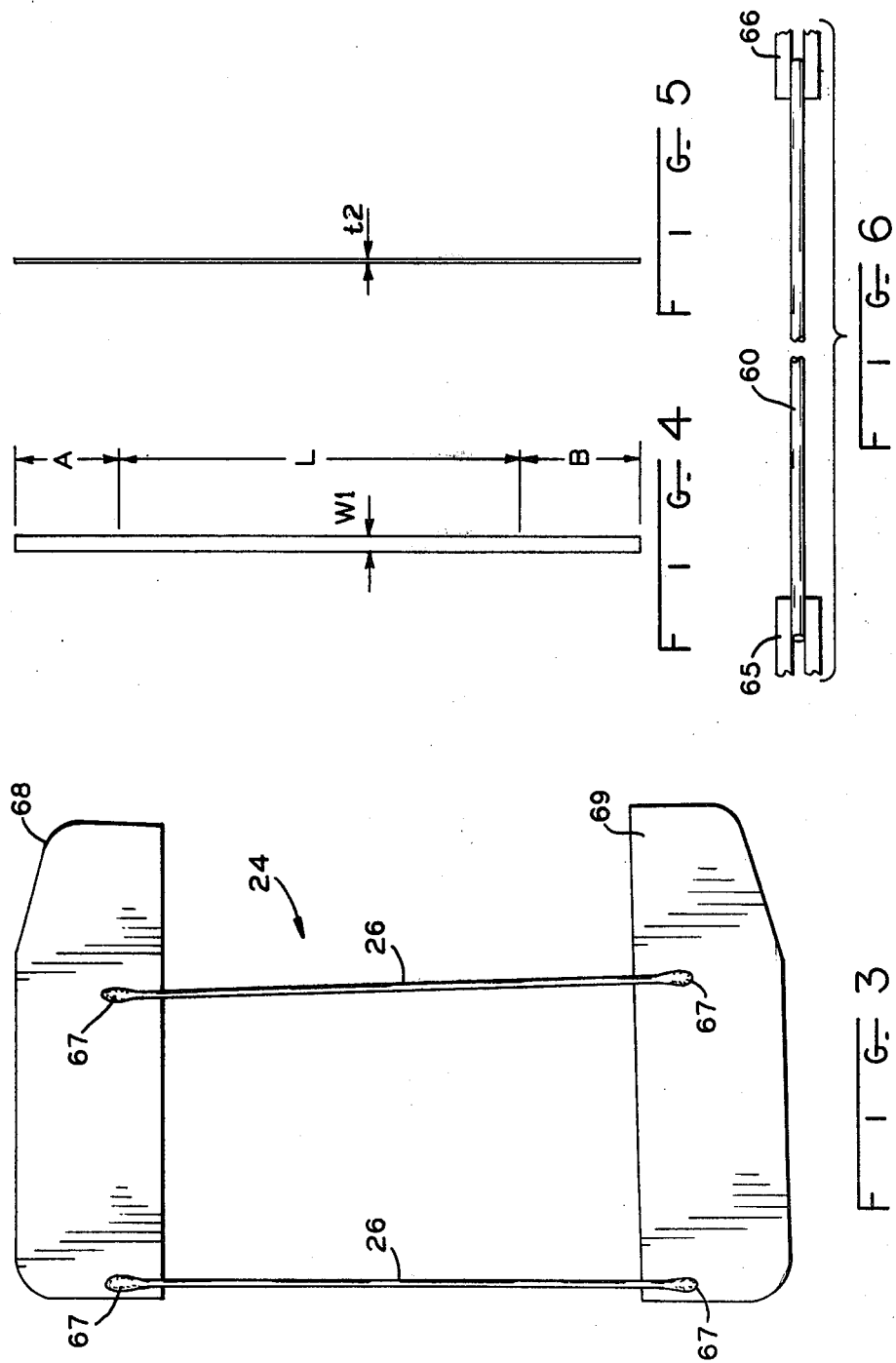

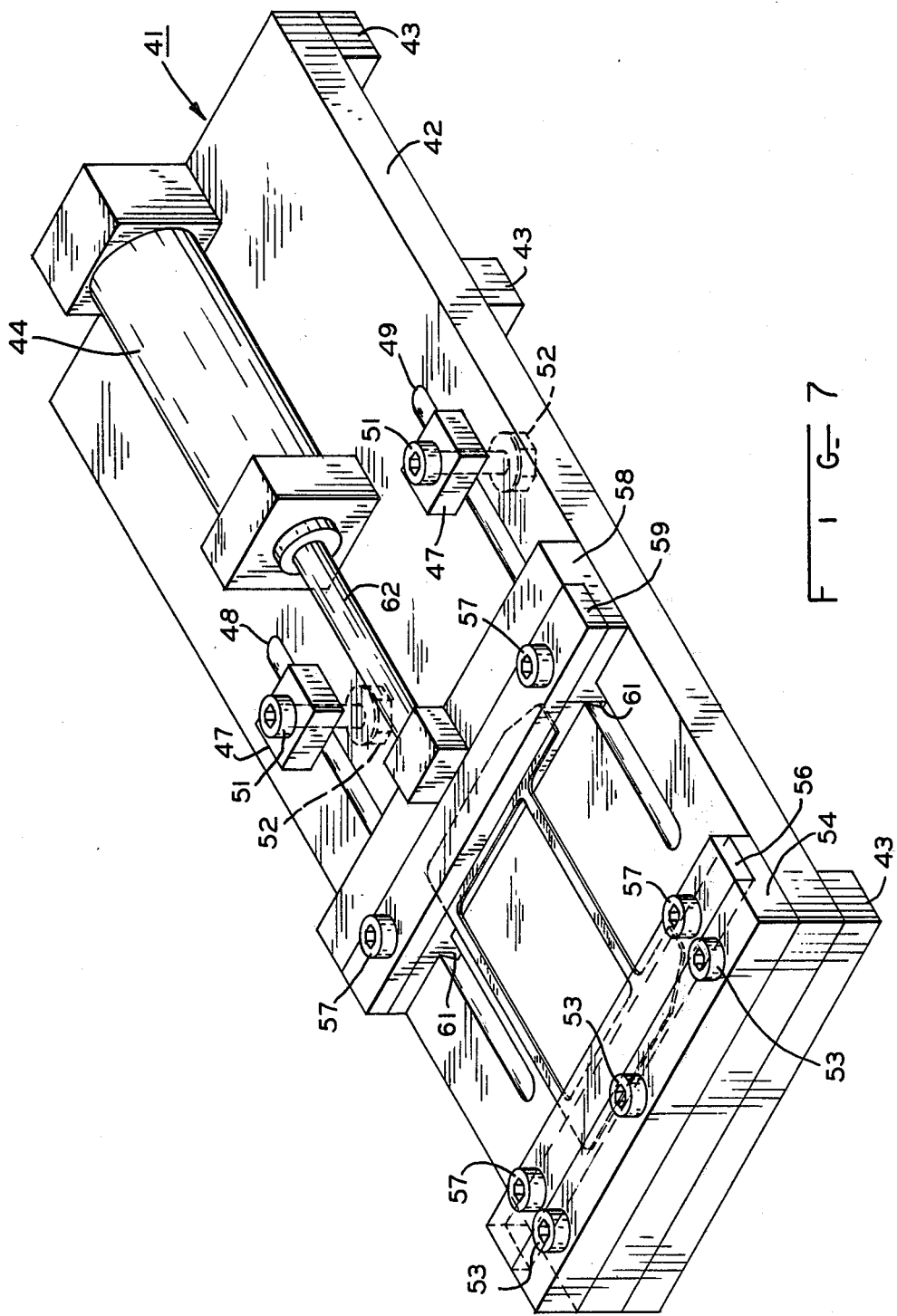

METHODS FOR MAKING DYNAMOELECTRIC MACHINE PHASE INSULATORS

BACKGROUND OF THE INVENTION

The present invention relates to methods for manufacturing phase insulators.

Insulators for separating different winding phases of dynamoelectric machines such as motors are generally well known in the prior art. For example, Stein U.S. Pat. No. 3,575,623 of Apr. 20, 1971; McNeal U.S. Pat. No. 4,100,005 of July 11, 1978; and Droll United Kingdom Pat. No. 1,461,126 of Jan. 13, 1977 all illustrate and describe what is referred to herein as phase insulation. Moreover, U.S. Pat. No. 4,216,571 which was filed June 22, 1978 in the name of Sammy L. Miller and Alan L. Kindig and which issued into U.S. Pat. No. 4,216,571 on Aug. 12, 1980 (entitled: "Methods and Apparatus For Inserting Winding End Turn Phase Insulation") relates to, among other things, utilization of phase insulation.

The above-referenced patents and application contain subject matter which is relevant to the invention claimed herein and the disclosures of all of such patents and the application are incorporated herein by reference in order to shorten the content of this specification.

As thoroughly treated in the above-referenced McNeal and Droll patents, methods utilized long prior to the present invention in the fabrication of phase insulation have been wasteful of material. One of the more common practices heretofore has involved the stamping of phase insulation pieces from a sheet or strip of insulating material. This process has resulted in the production of large volumes of scrap, with the amount of scrap being generally proportional to the length of the "connectors" which interconnect generally planar insulation pieces that ultimately are circumferentially disposed in a stator assembly between radially spaced, circumferentially extending end turn portions of two different phase windings.

Another problem is that when phase insulators are to be stamped or die cut from insulating stock, different dies must be provided in order to produce insulators that are to be used with motors having different stack heights. For example, one die would be provided which would produce phase insulators having connectors of slightly over two inches for use in motors having core lengths (also called stack heights) of two inches. It will be understood that motor manufacturers typically produce motors having stack heights of relatively wide ranges, and wherein one stack height will differ from another by increments as small as $\frac{1}{8}$ to $\frac{1}{4}$ of an inch. Thus, insulators produced from a die such that the connectors are two inches long would not be usable with a motor having a stack height of $2\frac{1}{4}$ inches. This, of course, necessitates having a die capable of producing phase insulators with connectors having a length slightly in excess of $2\frac{1}{4}$ inches. It thus should be understood that it would be desirable to provide new and improved methods and apparatus that could be utilized in the manufacture of phase insulation and new and improved forms of phase insulation such that the waste or scrap problem previously mentioned is diminished and which also would help in solving the problem associated with large inventories of phase insulation dies. Desirably, an optimum solution would also reduce the lost time associated with setting up many different dies in order to provide phase insulators of different dimensions and would also reduce the overall maintenance expense associated with having many different dies that primarily differ one from another by the length of the connectors that are produced from such dies. The above-referenced Droll patent and McNeal patent represent one approach that may be used to solve some of the problems just mentioned. However, even when following the approach represented by McNeal and by Droll, it would be desirable to still further reduce the amount of material utilized in producing individual phase insulators.

The above-referenced Miller et al application teaches one approach for automatically placing phase insulation in stator cores; and the above-referenced Droll patent teaches a very different approach for machine placing phase insulation in the slots of stator cores. While those approaches are desirable, I have determined that some problems may be encountered due to the inherent nature of the insulator pieces that have been available heretofore. More specifically, when insulation pieces manufactured as illustrated in the Droll patent are placed in automatic coil placing equipment, problems arise due to the fact that the connectors of phase insulation fabricated as described by Droll do not become properly positioned in stator slots. In the case of the approach described by Miller et al, difficulties may be encountered in positioning the connectors of phase insulation in the slots of the insulator placing tooling disclosed by Miller et al.

The invention disclosed herein not only contribute to a solution of the waste, die inventory, and die maintenance problems discussed hereinabove; but also somewhat surprisingly, alleviate the problems that would be encountered when machine placing fabricated insulators where filamentary type connectors are used to interconnect planar insulation pieces.

More specifically, insulators produced as described in the Droll patent are produced from planar insulation material and filamentary material which typically is supplied in coiled or rolled form. Such material tends to have a curvature or "set". This curvature appears to remain and still be present in the material even after phase insulators have been formed. However, curvature of the connectors in the phase insulation pieces is particularly troublesome when machines are used to automatically place such connectors in long straight slots—whether such slots be the slots of a stator core or the slots of insulator placing apparatus.

Accordingly, it would be desirable to provide new and improved phase insulators characterized by straight filamentary connectors. It would also be desirable to provide new and improved methods and apparatus for producing phase insulators whereby the die inventory, die maintenance, and scrap problem associated with the prior art approaches is at least diminished. It would be especially desirable to provide new and improved approaches whereby phase insulators could be fabricated utilizing a filamentary connector approach as known hereinbefore but wherein better material utilization is accomplished and wherein problems associated with curved connectors are avoided.

Accordingly, it is a general object of the present invention to provide new and improved methods for making phase insulators whereby the above and other desirable features may be provided.

More specifically, it is one object of the present invention to provide new and improved methods of making phase insulators so that scrap associated with the manufacture of stamped insulation is no longer directly proportional to the length of connectors used in the phase insulation.

It is another specific object of the present invention to provide new and improved methods for producing phase insulators whereby stamped phase insulators may be produced from a single die and yet which may be utilized in stators of widely varying stack heights.

It is still another object of the present invention to provide new and improved methods of making phase insulators, such that the amount of material required for the connectors is diminished.

Yet another object of the present invention is to provide new and improved methods which accomplish the last stated object even when the insulators are fabricated as taught by either of the above-referenced McNeal or Droll patents.

Yet another specific object of the present invention is to provide new and improved methods so that phase insulators may be easily machine inserted into straight slots even when filamentary material is utilized as the connector portion of the phase insulation.

SUMMARY OF THE INVENTION

In carrying out the above and other objects in preferred embodiments, I provide a method of making a phase insulator for a dynamoelectric machine from phase insulation severed from a sheet of insulating material wherein the phase insulation comprises first and second spaced apart planar portions interconnected by at least two connectors extending therebetween. In one preferred method, I stretch the connectors so as to increase the spacing between the planar portions and thereby produce phase insulators of sizes other than the originally produced phase insulation. In this manner, phase insulators may be severed from stock material by a single die and then be utilized with stator cores of relatively wide stack heights. The step of stretching the connectors is preferably performed so that the connectors will be stretched to a predetermined length corresponding to the stack height of a stator core with which the phase insulator is to be assembled. When performing the method just described, the phase insulator as initially produced will have a thickness corresponding to the thickness of the initial stock material. However, after elongation of the connectors, the width and thickness of the connectors is decreased.

In another method, fabricated insulators known prior to the present invention are modified by stretching filamentary connector portions so that phase insulators of a first size may be used with stator cores that would otherwise require phase insulators of a second, larger size (i.e., having longer connectors).

In accordance with another aspect of the present invention, filamentary or flat strip material is straightened and may be prestretched or elongated and subsequently fabricated with planar insulation pieces so as to provide phase insulators having any desired connector length. In one specific embodiment, filamentary material is preferably stretched in the neighborhood of 10 percent prior to being fabricated with planar insulation pieces. This approach not only results in a reduction (in the neighborhood of 10 percent) in the amount of filamentary material that must be used for a given connector, but also somewhat unexpectedly, overcomes many problems that might otherwise be encountered. More specifically, when filamentary material is obtained in rolled or reel form, it typically has a curvature when it is unrolled. By stretching such material in the neighborhood of 10 percent, a diameter reduction in the neighborhood of 10 percent results. In addition, the resulting stretched segments take on a straight configuration and the "set" or curvature of the filamentary material is removed. I have found that the curvature is removed when the filamentary material is stretched beyond the elastic limit of the filamentary material but not so great as to cause breakage of the filamentary material.

In accordance with another form of the invention, I provide new and improved stator assemblies wherein phase insulation is provided that includes circumferentially extending insulation portions, and wherein legs or connectors for the circumferentially extending portions are made from insulating material that is in a prestressed and pre-elongated condition. In one preferred form, phase insulators embodying my invention comprise two spaced apart planar portions formed from insulating material that are interconnected by at least one connector with the connector being in a straightened, stressed, somewhat hardened, elongated condition. When such phase insulators are fabricated, the connectors and planar portions are fused together—more preferably by ultrasonic welding of the pieces. When following the methods described hereinabove, wherein flat material is utilized as the connector portion of phase insulators, the molecular orientation of the insulating material used (that is, the "grain") of the material may be oriented transversely or longitudinally with the longitudinal extent of the connector. Different results are obtainable, depending upon the grain direction of the material, all of which are spelled out in more detail hereinbelow.

Apparatus for use in the manufacture of phase insulation for dynamoelectric machines is also illustrated herein wherein the apparatus includes clamping means for clamping planar portions of one or more phase insulators interconnected with at least one longitudinally extending connector. In addition, I provide means for moving the clamping means relative to one another a predetermined distance and thus for moving the planar portions relative to one another so that the at least one connector is stretched the predetermined amount. When at least two connectors are provided, a window, initially defined by the planar insulation portions and the two connectors, is elongated or enlarged as will be understood from the more detailed descriptions that are presented hereinbelow.

The aforementioned and other objects, features, still other specific methods, and other advantages of the present invention will become apparent from the following detailed description thereof. The description itself may be more readily understood when considered in conjunction with the drawings accompanying this specification. However, the exemplifications set out herein represent preferred embodiments of the invention in various forms thereof, and such exemplifications should not be construed as limiting.

BRIEF DESCRIPTION OF THE DRAWINGS

FIG. 1 is a view of a stamped or die cut phase insulator made and utilized according to the prior art and having a connector length (or window length) of about 2⅜ inches (60.325 mm);

FIG. 2 is a plan view, to the same scale as FIG. 1, embodying one form of a phase insulator that may be produced by practicing one of my new and improved methods, with the phase insulator of FIG. 2 being made from a phase insulator substantially identical to the prior art insulator shown in FIG. 1; it being noted that the connector length or window opening of the phase insulator in FIG. 2 is approximately 3¾ inches (95.25 mm);

FIG. 3, to the same scale as FIG. 2, shows a fabricated phase insulator in yet another form, with such insulator being produced by practicing still other methods embodying my invention;

FIG. 4 is a plan view of a strip of insulating material which, when considered with a discussion thereof presented hereinbelow, is useful in understanding how one form of my invention may be put into practice;

FIG. 5 is a side elevation of the insulation strip shown in FIG. 4;

FIG. 6 is a schematic representation of the means by which some aspects of my invention may be practiced;

FIG. 7 is a perspective view of apparatus that may be utilized when practicing my invention in one form thereof in order to produce insulators embodying the present invention in one form.

DESCRIPTION OF THE PREFERRED EMBODIMENTS

Figure 8:
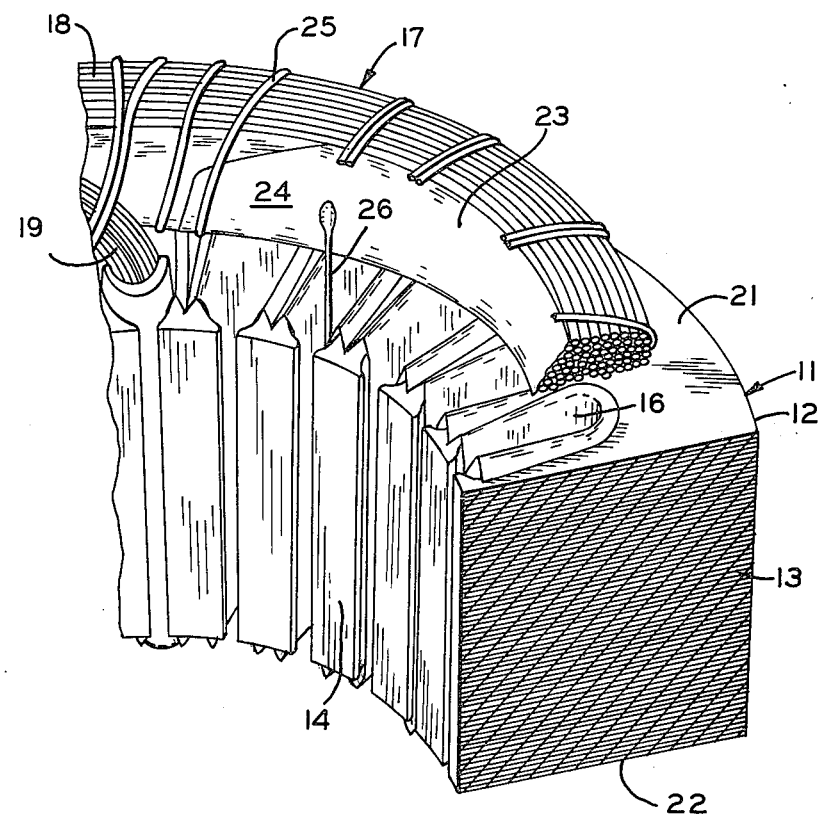
FIG. 8 is a view in perspective, with parts removed and parts broken away, of a new and improved stator assembly which includes phase insulators produced according to the invention disclosed herein.

The inventions disclosed herein are of primary utility in the dynamoelectric machine art. Accordingly, and with initial reference to FIG. 8, portions of a dynamoelectric machine illustrated as a stator assembly have been illustrated. The stator assembly 11 includes a magnetic core 12 that is formed from a plurality of laminations 13. The laminations have an outer peripheral surface which establishes the outer surface of the core 12, and a plurality of teeth, the outer extremities of which define a centrally disposed axially extending stator bore 14. The teeth of the laminations, and thus the core, define a plurality of axially extending slots 16 which accommodate the side turn portions of energizable windings 17.

The stator assembly shown in FIG. 8 is adapted for use in conventional single phase applications, but it will be understood that the present invention may also be of substantial advantage in connection with stator assemblies that are to be utilized for three phase power applications. In FIG. 8, a first winding phase 18 and a second winding phase 19 have been shown which, as will be understood, are utilized to provide a rotating field at least for initiating rotation of a rotor accommodated within the bore 14. When the winding phases 18 and 19 are concurrently energized, the voltages and currents in such phases are "out of phase" with one another; and in many applications, insulation is disposed between contiguous portions of the winding phases in order to increase the dielectric constant between such winding phases. The side turn portions of the windings which are accommodated in the core slots are separated from one another by what is commonly known in the art as "slot" insulation. The end turn portions of the winding phases 18, 19, which extend circumferentially about the face 21 (and of course the lower face 22) are separated from one another by still another specialized form of insulation commonly called "phase" insulation, "end turn" insulation, "window" insulation, "ladder" insulation, and "H insulation".

The part of the "phase" insulation which is most relied upon for electrical insulating purposes is that part which is disposed between the end turns of the windings that extend circumferentially about the face of the core. Such a portion has been identified by the reference numeral 23 in FIG. 8. It will be noted that the insulation piece 23 extends circumferentially about the face 21 of the core and separates the end turns of winding phases 18, 19. "Laces" or cord 23 may, if desired, be used to confine the end turns of the winding phases and to also hold the phase insulation in place. However, during the manufacture of the stator assembly shown in FIG. 8, the normal sequence of operations would be to position side turn portions of the winding phase 18 in preselected ones of the slots 16, subsequently position phase insulation with connectors or legs of the phase insulation pieces disposed in slots of the core, and then even later position the winding phase 19 on the core by accommodating side turn portions of the winding phase 19 in the core slots. During this sequence of operations, and prior to lacing or tying the winding end turns in place, some means must be provided to prevent the phase insulation from becoming mispositioned, or inadvertently removed from its desired placement between the different winding phases. The means utilized to perform this purpose are the "legs" or "connectors" of the phase insulation.

In some applications, as will be understood, it is desirable to machine place or automatically place the phase insulation in the slots of the stator cores. Various problems associated with this type of approach are spelled out both in the aforementioned Miller et al application as well as in the aforementioned United Kingdom patent of Droll. In some applications, it is also desirable to simultaneously position, with the aid of automatic equipment, the phase insulation at the same time that one or more of the winding phases are being put into place in the stator assembly.

By utilizing the present invention, all of the above-mentioned approaches may be utilized with a minimum number of problems while obtaining maximum utilization of the material used to produce the phase insulation. Thus, the phase insulation generally denoted by the reference numeral 24 utilizes end portions 23 and a plurality of connectors 26. Preferably, the phase insulation 24 is produced while practicing the present invention in one of the preferred forms thereof. In the interest of minimizing unnecessary drawing content, the winding material, cord, and phase insulation that would be disposed adjacent the lower core face 22 have been omitted from FIG. 8. The phase insulator 24, itself, however is shown in detail in FIG. 3.

Before turning to FIG. 3, attention is directed to FIG. 1 which illustrates one form of typical prior art phase insulator 27. It will be noted that the prior art phase insulator 27 includes generally planar end portions 28, 29 and connectors 31, 32. In the prior art, phase insulation is known having two connectors, three connectors, and sometimes four or more. It should be understood that when phase insulation embodying the present invention (or made according to the present invention, or made by utilizing apparatus according to the present invention) is utilized; the number of connectors is not of primary importance other than to the extent that the provision of additional connectors may require the use of additional amounts of material.

Still having reference to FIG. 1, the planar end portions 28, 29 are conventionally assembled in the stator assembly so that they extend circumferentially about an end face of a stator core and separate the end turn portions of two different phase windings as should now be understood. It also should be understood that the transverse distance between the end portions 28, 29 (i.e., the longitudinal length or extent of the connectors 31, 32) must correspond to the height or axial length of the stator core with which the insulator 27 is to be used. Thus, the length of the connectors 31, 32 will be in the neighborhood of two inches for a core having a two inch stack height; will be in the neighborhood of five inches for a core having a five inch stack height; will be in the neighborhood of 2¼ inches for a core having a 2¼ inch stack height; and so forth. It also should now be understood that when the phase insulator 27 is made according to the prior art procedures, wherein the entire insulator 27 is stamped or otherwise severed from a strip or sheet of insulating material, substantial amounts of the material will be wasted. This occurs because the material stamped from the areas bounded by the connector and end pieces typically is not of a size that can be used for any commercial purpose. Moreover, the material that is so scrapped very often cannot be reclaimed or reprocessed. For example, in many applications, a material such as polyethylene terephalate must be used. This material is a polymerization product and is not known to be reclaimable or recyclable. In addition, different dies must be used to produce insulators having different connector lengths and this is objectionable both from the standpoint of additional expense, inventory problems, maintenance problems, and time required to set up different dies before phase insulators of different sizes may be produced.

By utilizing one of the preferred methods of the present invention, many of the just-mentioned problems may now be overcome. More specifically, I have found that it is possible to grip the spaced apart planar end portions 28, 29 and stretch such portions apart thereby to increase the spacing between the planar portions, elongate the connectors 31, 32, and thus produce from a prior art phase insulator 27 a phase insulator of a different size. Investigations have now revealed that an insulator having connectors 31, 32 of a given length may be processed according to one of my preferred methods so as to produce a phase insulator having connectors that are any desired length up to twice the length of the original connectors. Reference to FIG. 2 may now be helpful in understanding how one preferred process is performed.

The insulator 33 shown in FIG. 2 was formed from an insulator substantially identical to the prior art insulator 27 of FIG. 1. Thus, it will be noted that the planar end portions 34, 36 of the insulator 33 are substantially identical to the planar end portions 28, 29 of the insulator 27. However, the connectors 37, 38 are substantially different from the connectors 31, 32. More specifically, the end portions 28, 29, 34, 36, and connectors 31, 32 all have a thickness corresponding to the thickness of the material from which the insulators 27, 33 were severed. However, the connectors 37, 38 are not only lengthened, but reduced both in thickness and in width as compared to the connectors 31, 32. The length of the connectors 31, 32, (see FIG. 1) is approximately 2⅜ to 2 7/16 inches long; however, the length of connectors 37, 38 (see FIG. 2) is approximately 3¾ inches long. As will be understood, this represents over a 50 percent increase in the length of the connectors (and in the size of the window defined thereby) without any corresponding increase in the amount of scrap that would be produced when making the insulator 33 as compared to the insulator 27.

It also will be noted that the connectors 37, 38 include transition portions 39 that are of gradually increasing thickness and width as compared to the thickness and width of the connectors 37, 38 in the central portions thereof.

With reference now to FIG. 7, one form of apparatus embodying the invention will now be described which may be utilized to produce insulators embodying the present invention—whether such insulators be of the form illustrated in FIG. 2 or of the form illustrated in FIG. 3. The apparatus 41 includes first and second clamping means that may be utilized for clamping the first and second spaced apart planar portions of at least one phase insulator that is interconnected with one or more longitudinally extending connectors. In addition, the apparatus 41 includes means for relatively moving the first and second clamping means a predetermined distance while tightly gripping the planar portions of the insulator whereby the one or more connectors will be stretched a predetermined amount that is determined by the predetermined relative movement of the clamping means.

As will be appreciated from a review of FIG. 7, the apparatus shown therein includes a base plate 42, legs 43, cylinder means in the form of a pneumatic cylinder 44; and adjustable stop means which have been illustrated as blocks 46, 47 which are adjustably positionable in a pair of slots 48, 49. When the blocks 47 are in a desired position along the extent of the slots 48, 49, bolts 51 and nuts 52 are tightened to maintain such position. Fastened to the base plate 42 by means of screws 53 is a vice or clamp part 54 which cooperates with an upper movable clamp part or jaw 56. The jaw 56 may be tightened down against one or more planar end portions of one or more pieces of phase insulation by tightening the screws 57 as will be understood. Clamp parts 58, 59 which generally correspond respectively to the clamp or jaw parts 54, 56 are also provided. However, rather than being permanently fixed to the base plate 42, the lower clamp part 58 is attached to the rod 61 of the cylinder 44 and thus is movable with the rod upon actuation of the cylinder 44. Rectilinear movement of the clamp assembly involving jaws 58, 59 is assured by means of keys 61 attached to the lower jaw 58, because the keys 61 are constrained to move within the slots 48, 49. In preparation for utilizing the apparatus 41, the jaws 56, 59 are loosened and one or more insulators are trapped in the clamping means. Thereafter, the cylinder 44 is actuated to retract the rod 61 and thereby stretch the connectors of the insulators held in the clamping means until the clamping jaw 58 abuts against the stops 47. It will be understood that the stops 47 are positioned so that the connectors of the insulators will not be stretched to the point where they break. By adjusting the position of the stops 47, insulators as shown at 27 in FIG. 1 may be configured to have any desirable size up to the point where the connectors would break. Usually, it will be most convenient for a producer to make insulators of the smallest size (i.e., stack height) needed, and then resize such insulators for longer motors (i.e., longer cores) as needed. As previously noted, insulators made of polyethylene terephalate and proportioned as shown in FIG. 1 may be resized safely at least to such an extent that the length of the connectors is in fact doubled. For information purposes, the width of connectors 31, 32 was roughly four millimeters, while the width of connectors 37, 38 at the central portions thereof was roughly two and one half to three millimeters. The insulator shown in FIG. 1 was stamped from polyethylene therephalate 0.0075 inch thick sheet material so oriented that the longitudinal extent, i.e., length of the connectors 31, 32 (and thus connectors 37, 38 in FIG. 2) was in the same direction as the direction of molecular orientation or "grain" of the sheet material from which the insulators 27 and 33 were severed.

In tests that have now been performed on polyethylene terephthalate obtained commercially from E. I. DuPont de Nemours and Company as MYLAR material, it has been determined that for material having a thickness of 0.0075 inches (0.19 mm) the material had a tensile strength of 23,000 psi and could be elongated at least one hundred and sixty-seven percent (167%). On the other hand, when the insulators were severed from strip material so that the connectors 31, 32 were transverse to the direction of grain orientation, the connectors had a tensile strength of 22,000 psi and could be safely elongated at least one hundred and twenty-seven percent (127%). FIGS. 4 and 5 represent strips of MYLAR material on which tests were performed.

With reference to FIGS. 4 and 5, material having an original thickness t2 of 0.0075 inches were used and all of the test pieces had an overall length of eight inches. The test pieces were gripped in fixtures at the ends thereof for a distance represented in FIG. 4 as distances A and B, leaving a length L to be stretched. In all instances, the test pieces were gripped along 1-½ inches at the ends thereof so that the lengths A and B were equal to 1-½ inches (38.1 mm). Since all of the test pieces were eight inches long, (203.2 mm), a central length L of five inches (127 mm) was stretched. Pieces of material slit to have different widths W1 were stretched, and data was tabulated before and after stretching. Then, percentage reductions in thickness and width were tabulated. The data obtained is presented hereinbelow in tabular form in Tables I and II. The data appearing in Table I was obtained when the length L of the test pieces extended "cross-grain", and the data in Table II hereinbelow was obtained with test pieces wherein the length L of the pieces was in the direction of the grain and thus were stretched in the same direction as the grain or molecular orientation of the material.

TABLE I

| Sample Number | Initial W1, (in) | Initial t2, (in) | Final W1, (in) | Final t2, (in) | % Reduction in W1, % | t2, % |
|---|---|---|---|---|---|---|
| 1 | 0.193 | 0.0075 | 0.160 | 0.0072 | 17 | 4 |
| 2 | 0.178 | 0.0075 | 0.1505 | 0.0072 | 15 | 4 |
| 3 | 0.186 | 0.0075 | 0.1565 | 0.0072 | 16 | 4 |

TABLE II

| Sample Number | Initial W1, (in) | Initial t2, (in) | Final W1, (in) | Final t2, (in) | % Reduction in W1, % | t2, % |
|---|---|---|---|---|---|---|
| 4 | 0.193 | 0.0075 | 0.1625 | 0.0073 | 16 | 2.7 |
| 5 | 0.2025 | 0.0075 | 0.172 | 0.0073 | 15.5 | 2.7 |
| 6 | 0.187 | 0.0075 | 0.160 | 0.0073 | 14.4 | 2.7 |

It will be appreciated from reviewing the data of Tables I and II, that polyethylene terephalate will more easily be elongated by stretching it in the direction of the grain and that the major portion of the increase in length is provided by reduction in the thickness (t2) of the material. Moreover, it generally seems that the width undergoes a relatively larger percentage of reduction for wider pieces of material as compared to more narrow pieces of material. All of the test samples that were stretched in order to provide the data for Tables I and II were stretched so that the initial five inches of length were stretched to a final length of seven inches in order to establish an elongation of 40 percent. This data is presented in order to provide a guideline and teaching basis for application of one aspect of applicant's present invention.

With reference now to FIG. 3, it is to be understood that the phase insulator 24 may be fabricated by following the instructions contained in the above-referenced McNeal patent or in the above-mentioned United Kingdom patent of Droll. Either flat or filamentary material may be utilized as connectors 26 which are ultrasonically welded as depicted at 67 to the planar end portions 68, 69. The connectors thus may be welded to the end pieces by utilizing filamentary material in its "as manufactured" state or after being stretched. Alternatively, strips as represented in FIGS. 4 and 5 may be used in their stretched or unstretched condition. When the connectors are welded in an unstretched state, the phase insulator may be clamped in the apparatus 41 and the apparatus 41 actuated in order to elongate and stretch the connectors 26.

As an alternative to stretching the individual connectors in the apparatus 41, it is actually preferred to pre-stress, pre-elongate, and prestretch connector material as schematically depicted in FIG. 6. Investigations that have now been performed indicate that it is preferable for a number of reasons to prestretch or prestress connector material while it is in relatively long length or as it is being unreeled from a supply, and thereafter sever the desired lengths of connectors from the bulk connector material followed by fusion bonding the ends of the connectors to the planar end portions of an insulator. One mode of doing this may be understood by having reference to FIG. 6. FIG. 6 schematically depicts approximately 10 feet (2.54 meters) of filamentary material 60 clamped at its ends by vice 65 and pliers 66. It then is elongated so that the filamentary material undergoes inelastic elongation. Thereafter, the filamentary material is severed into pieces of desired lengths and fusion connected, for example by ultrasonic welding, to the insulator end pieces. Material with which this procedure has been followed has been a polyester monofilament material marketed as "Travira" grade T-960 by Hoechst Fibers Ind., a division of American Hoechst Corporation having offices at 1515 Broadway at Astor Plaza, New York, N.Y. 10036. The particular size of material selected was 1.05 mm in diameter (0.042 inches). It has now been determined that the amount of filamentary material that is to be used to fabricate a given phase insulator may easily be reduced by at least 10 percent as compared to insulators made while following prior art procedures. More importantly, it has also now been discovered that problems associated with the use of monofilament connected phase insulators, as discussed in detail hereinabove, are overcome. In fact, the overcoming of these problems actually at times may outweigh the importance of the ten percent savings in material content.

More specifically, monofilament material is typically supplied in spools or reels of long lengths. However, such material has a "set" or curvature to it. When the material is simply severed as received and then used to fabricate a phase insulator as shown in FIG. 3, the "set" or curvature remains in the connectors 26, and such curvature interferes with trouble free insertion of the phase insulation—either into stator core slots while utilizing automatic coil placing equipment (as shown in the above-referenced Droll patent); or when attempting to automatically feed such phase insulators into automatic insulation inserting equipment (of the type shown, for example, in the above-referenced Miller and Kindig application). However, I have now determined that when monofilament material is elongated at least approximately 10 percent, the diameter will diminish from approximately 0.042 inches to approximately 0.039 inches (from about 1.05 mm to about 0.945 mm). At an elongation of approximately 10 percent, the filamentary material loses its curvature or set, and becomes straightened. This straightening effect on the material then avoids the problems mentioned hereinabove when attempting to use automatic equipment while the connectors of phase insulation have curvature set into them.

With the particular material identified hereinabove, the exertion of approximately 50 to 80 pounds of tension on the material is sufficient to cause the permanent reduction in diameter that appears to be needed in order to remove the curvature or set in the material. By calculating the amount of stress that is put on this material while stretching it with a force of 50 pounds, it appears that stressing the material with a tensile stress of at least approximately 41,883 psi will provide the desirable results that have just been discussed. In practice, a tensile stretching force of approximately 50 to 80 pounds applied to the material (of the indicated size) under consideration gives good results. It has now been found that typically it is adequate to exert approximately sixty pounds of force on such material to provide the permanent elongation of about 10 percent which has been described. The amount of force applied to the material is not dependent on the length of the material being stretched and thus this stressing with approximately 50 to 80 pounds tensile force is preferred, whether the material is three inches long or thirty feet long. However, the material should not be stretched to where it reaches its breaking point. On the other hand, the material should be stretched beyond its springback point; i.e., beyond its point of elastic deformation to take advantage both of the reduction in material usage and also to avoid the problems associated with curvature or a curved "set" in the material.

Based on the results obtained to date with the material described hereinabove, the tensile stress that should be applied in filamentary connectors should preferably be at least about thirty-six thousand pounds per square inch (36,000 psi), and preferably not substantially in excess of sixty-seven thousand pounds per square inch (67,000 psi). Stressing in this range causes the material to elongate, reduce in diameter and become "stiff" or hardened. However, the ability to ultrasonically weld the material does not seem to be diminished at all.

I have now also found that after insulators are fabricated as described herein, a slight amount of relaxation will take place if the filamentary material or flat material is not placed into the slots of a core shortly after it has been stretched. Thus, in those situations where phase insulation is to be fabricated in advance and then stored, the material in the connectors of the phase insulation should actually be elongated approximately one to two percent more than the core stack height (or axial length) of the stators in which the insulation is to be utilized. Alternatively, filamentary or flat strip may be cut to a length about one or two percent longer than otherwise would be needed prior to being fusion bonded to the insulation end pieces. Then, after being stored or inventoried for periods in excess of a week, the slight relaxation of the connectors will not create problems when placing the connectors in a stator. The amount of extra elongation that should be provided can of course be determined best empirically, but at the present time it appears that an extra length or degree of elongation of approximately two percent is sufficient to compensate for subsequent relaxation.

It is to be understood that fabricated insulators as shown in FIG. 3 may be elongated with the apparatus of FIG. 7, but it is not presently believed that such a procedure would be the preferred mode of practicing the present invention. However, when apparatus such as that shown in FIG. 7 is utilized, it would be preferred that stacks of insulators numbering four or more be resized at the same time. Different amounts of force, of course, will have to be applied to the insulators depending upon the exact nature and size of the connectors.

When insulators such as those depicted in FIG. 1 are stretched, and when such insulators are made from polyethylene terephalate having an initial thickness of 0.0075 inches a force of approximately thirty pounds per insulator is sufficient to elongate the material to whatever final connector length is desired.

In view of all of the foregoing, it should now be understood that I have provided means for producing stator assemblies of dynamoelectric machines having circumferentially extending end turn portions thereof insulated from one another by new and improved phase insulation having circumferentially extending portions positioned between the end turns of the winding phases. Moreover, the elongate legs or connectors that extend between and interconnect the circumferentially extending insulation portions are made from insulating material that is in a prestressed and pre-elongated condition. While polyethylene terephalate has been described as one material which may be utilized in one form of the invention, polyester monofilament material may be used in other embodiments of the invention. When the connectors are formed of monofilament material, it is most desirable that the material be stressed and elongated at least 10 percent so that it will be straightened in order to avoid manufacturing problems that have now been described in detail. In addition, elongated polyester monofilament material may be ultrasonically welded to polyethylene terephalate planar end portions as was done with the insulator 24 shown in FIG. 3.

When insulators such as the one shown in FIG. 2 are utilized, it is possible to measure the thickness and width of the connectors 37, 38 along the extent thereof and determine that the thickness and width of the connectors in the central portions thereof are less than the transition portions 39 of the connectors.

It should now be understood that this specification contains sufficient teachings for a person skilled in the art to gain the various advantages and benefits described hereinabove, by elongating phase insulator connector material by predetermined amounts. Such predetermined amounts should be understood to include (where needed) sufficient elongation to anticipate or compensate for subsequent relaxation of the elongated and prestressed material.

While the present invention has been described with respect to preferred embodiments of products, apparatus, and methods, numerous modifications will suggest themselves to those of ordinary skill in the art. Accordingly, the scope of the present invention is to be measured only by the appended claims.

What I claim as new and desire to secure by Letters Patent of the United States is:

1. A method of making a phase insulator for a dynamoelectric machine of a predetermined stack height, the method comprising the steps of severing a phase insulator from a sheet of insulating material having a preselected thickness and thereby forming an individual phase insulator having first and second spaced apart planar portions interconnected by at least one connector extending therebetween, with the planar portions and at least one connector initially having a thickness generally corresponding to the predetermined thickness; and subsequently stretching the at least one connector so as to increase the spacing between the planar portions thereby to produce a phase insulator of a size other than the size of the phase insulator as originally severed and of a size sufficient to accommodate subsequent relaxation of the connector, whereby an initially severed phase insulator may be used with stator cores of various stack heights.

2. The method of claim 1 wherein the length of the at least one connector as originally produced is increased, and the width and thickness thereof as originally produced is decreased.

3. The invention of claim 1 wherein the grain orientation of the insulating material is oriented in the same direction as the longitudinal extent of the at least one connector, and the step of stretching involves elongation not exceeding about one hundred and sixty-seven percent of the original length of the at least one connector.

4. The invention of claim 1 wherein the at least one connector extends longitudinally in a first direction, the orientation of the grain of the insulating material is transverse to the longitudinal extent of the at least one connector, stretching of the at least one connector is across the grain direction, and the elongation of the at least one connector is not in excess of about one hundred and twenty-seven percent of the original length of the at least one connector.

5. The invention of claim 1 wherein the grain orientation of the insulating material is oriented in the same direction as the longitudinal extent of the at least one connector.

6. The invention of claim 1 wherein the at least one connector extends longitudinally in a first direction, and the orientation of the grain of the insulating material is transverse to the longitudinal extent of the at least one connector.

7. A method of making a phase insulator for a dynamoelectric machine, from phase insulation severed from a sheet of insulating material having a preselected thickness and having a first and second spaced apart planar portions interconnected by at least two connectors extending therebetween, with the planar portions and connectors having a thickness generally corresponding to the predetermined thickness; the method comprising: stretching the connectors so as to increase the spacing between the planar portions thereby to produce a phase insulator of a size other than the size of the phase insulation as initially severed whereby initially produced phase insulation may be used with stator cores of various stack heights.

8. The method of claim 7 wherein the length of the connectors as originally produced is increased, and the width and thickness thereof as originally produced is decreased.

9. The invention of claim 7 wherein the grain orientation of the insulating material is oriented in the same direction as the longitudinal extent of the connectors, and the step of stretching involves elongation not exceeding one hundred and sixty-seven percent of the original length of the connectors.

10. The invention of claim 7 wherein the connectors extend longitudinally in a first direction, the orientation of the grain of the insulating material is transverse to the longitudinal extent of the connectors, stretching of the legs is across the grain direction, and the elongation of the connectors is not in excess of one hundred and twenty-seven percent of the original length of the connectors.

11. The invention of claim 7 wherein the grain orientation of the insulating material is oriented in the same direction as the longitudinal extent of the connectors.

12. The invention of claim 7 wherein the connectors extend longitudinally in a first direction, and the orientation of the grain of the insulating material is transverse to the longitudinal extent of the connectors.

13. The invention of claim 7 wherein the connectors of a plurality of phase insulation pieces are stretched at substantially the same time.

14. A method of making phase insulation for a dynamoelectric machine, the method comprising the steps of straightening segments of filamentary insulating material having an initial curvature, and utilizing the straightened segments as connectors in fabricated phase insulators by fusing ends of the straightened segments to planar insulating pieces thereby to produce phase insulators comprised of the planar insulation pieces interconnected by the straightened segments.

15. The method of claim 14 wherein the straightened segments are elongated segments and are filamentary in nature, are elongated in the neighborhood of 10 percent, are severed to a predetermined length corresponding to a predetermined stator core length, and the filamentary material has a curvature set prior to elongation.

16. The method of claim 14 wherein the segments are elongated flat insulating material and wherein the elongated segments are fused together with the planar insulating pieces.

17. The method of claim 14 wherein the planar pieces are formed from polyethylene terephalate.

18. The method of claim 17 wherein the segments are elongated and formed from polyethylene terephalate.

19. The method of claim 17 wherein the elongated segments are formed from polyester monofilament.

20. A method of making phase insulation for a dynamoelectric machine, the method comprising the steps of joining together first and second planar insulation pieces with longitudinally extending connectors, and elongating the longitudinally extending connectors a predetermined amount by stretching such connectors.

21. The method of claim 20 wherein the longitudinally extending connectors are formed from filamentary material.

22. The method of claim 21 wherein the longitudinally extending connectors are formed from a polyester monofilament.

23. The method of claim 20 wherein the longitudinally extending connectors are flat strips of material.

24. The method of claim 23 wherein the longitudinally extending connectors and the planar portions are polyethylene terephalate material.

25. The method of claim 14, wherein the step of elongating segments includes stressing such segments with a tensile stress of at least about 36,000 psi but less than about 67,000 psi.

26. The method of claim 20 wherein the step of elongating includes stressing the connectors with a tensile stress of at least about 36,000 psi, but less than about 67,000 psi.

27. A method of making phase insulators for a dynamoelectric machine, the method comprising the steps of elongating longitudinally extending filamentary material segments a predetermined amount corresponding to a preselected stator core stack height by subjecting such segments to a tensile stress of at least about 36,000 psi but less than about 67,000 psi, and thereby elongating such material into straightened segments, and joining together first and second planar insulation pieces with such elongated segments.

* * * * *